(12) United States Patent
Ikarashi

(10) Patent No.: US 10,784,772 B2
(45) Date of Patent: Sep. 22, 2020

(54) SWITCHING POWER SUPPLY

(71) Applicant: TDK Corporation, Minato-ku, Tokyo (JP)

(72) Inventor: Tomokazu Ikarashi, Tokyo (JP)

(73) Assignee: TDK CORPORATION, Minato-Ku, Tokyo (JP)

( * ) Notice: Subject to any disclaimer, the term of this patent is extended or adjusted under 35 U.S.C. 154(b) by 138 days.

(21) Appl. No.: 16/132,966

(22) Filed: Sep. 17, 2018

(65) Prior Publication Data

US 2019/0131864 A1    May 2, 2019

(30) Foreign Application Priority Data

Nov. 1, 2017 (JP) .................................. 2017-212056

(51) Int. Cl.
| | |
|---|---|
| *H02J 1/10* | (2006.01) |
| *H02M 1/42* | (2007.01) |
| *H02M 1/10* | (2006.01) |
| *H02M 3/42* | (2006.01) |
| *H02M 1/12* | (2006.01) |
| *H02M 7/36* | (2006.01) |

(52) U.S. Cl.
CPC ............. *H02M 1/10* (2013.01); *H02M 1/12* (2013.01); *H02M 1/4225* (2013.01); *H02M 1/4233* (2013.01); *H02M 3/42* (2013.01); *H02M 7/36* (2013.01)

(58) Field of Classification Search
CPC ........ H02M 1/10; H02M 1/12; H02M 1/4225; H02M 1/4233; H02M 3/42; H02M 7/36
See application file for complete search history.

(56) References Cited

FOREIGN PATENT DOCUMENTS

| JP | 2009-177935 A | 8/2009 |
| JP | 2013-99209 A | 5/2013 |
| JP | 2015061392 A | 3/2015 |

OTHER PUBLICATIONS

Chinese Office Action issued in corresponding Chinese Application No. 201811130685.6 with English translation, dated May 21, 2020 (15 pages).

*Primary Examiner* — Robert L Deberadinis
(74) *Attorney, Agent, or Firm* — Flynn Thiel, P.C.

(57) ABSTRACT

A switching power supply that has a reduced conduction loss, when a direct current power supply is connected as an input power supply, by changing a part of a circuit for alternating current-to-direct current conversion, is provided. The switching power supply includes power input terminals to which the direct current power supply or an alternating current power supply is connected; power output terminals configured to output electric power; a smoothing capacitor connected between the power output terminals; a first non-insulated chopper circuit connected between the power output terminals; a second non-insulated chopper circuit connected between the power output terminals; and a switching circuit configured to switch a connection circuit provided between the first non-insulated chopper circuit and the second non-insulated chopper circuit, and the power input terminals.

18 Claims, 7 Drawing Sheets

SWITCHING POWER SUPPLY

CROSS-REFERENCE TO RELATED APPLICATION

This application claims priority to Japanese Patent Application No. 2017-212056 filed Nov. 1, 2017 which is hereby expressly incorporated by reference herein in its entirety.

BACKGROUND OF THE INVENTION

1. Field of the Invention

The present invention relates to a switching power supply that can switch between an ACDC converter function and a DCDC converter function.

2. Description of the Related Art

Switching power supplies having a so-called alternating current-to-direct current conversion function (ACDC converter function) to generate direct current outputs of a constant voltage from alternating current power supplies are used in an enormous variety of electronic equipment. There are also a lot of switching power supplies having a direct current-to-direct current conversion function (DCDC converter function) to boost or reduce voltages to generate appropriate direct current output voltages in circuits.

In electronic equipment using alternating current power supplies, it is mandatory to suppress harmonic currents to specified values or less. Accordingly, the technologies of switching power supplies having a power factor improvement circuit (power factor correction (PFC) circuit) are conventionally disclosed (for example, Japanese Patent Application Laid-Open No. 2009-177935). In electronic equipment using direct current power supplies, switching power supplies that are provided with an interleaving voltage boosting circuit are conventionally disclosed (for example, Japanese Patent Application Laid-Open No. 2013-99209).

FIG. 7A is a circuit diagram of a switching power supply 200 having a high efficiency PFC circuit, which is referred to as a so-called dual boost PFC circuit. To the switching power supply 200, an alternating current power supply 210 is connected as an input power supply. A constant direct current voltage is outputted from power supply output terminals 220. Between output terminals of the alternating current power supply 210 and the power supply output terminals 220, voltage boosting circuits constituted of reactors, diodes (reverse current prevention elements and the like), and switching elements, a control unit (not illustrated) configured to control the switching elements, diodes for noise suppression, and the like are provided, in order to suppress harmonic currents and to improve a power factor.

However, as illustrated in FIG. 7B, combining a direct current power supply 230 with the dual voltage boosting circuit brings about the problem of an increase in conduction loss. The same problem occurs in voltage reducing circuits, as well as the voltage boosting circuit.

SUMMARY OF THE INVENTION

The present invention has been made in view of the aforementioned problems. It is an object of the invention to provide a switching power supply that is configured to have a reduced conduction loss, even in the case of being connected to a direct current power supply, by changing a part of a circuit.

In the present invention, by provision of a switching circuit configured to switch connection using, for example, conductive members (jumper members), a dual circuit, which is used as a high efficiency power factor improvement circuit when an input power supply is an alternating current power supply, can be switched into an interleaving circuit having a reduced conduction loss when the input power supply is a direct current power supply.

The present invention provides a switching power supply including: power input terminals to which a direct current power supply or an alternating current power supply is connected as an input power supply; power output terminals configured to output electric power; a smoothing capacitor connected between the power output terminals; a first non-insulated chopper circuit connected between the power output terminals; a second non-insulated chopper circuit connected between the power output terminals; and a switching circuit configured to switch a connection circuit provided between the first non-insulated chopper circuit and the second non-insulated chopper circuit, and the power input terminals.

According to the invention, there is provided the switching circuit configured to switch the circuit between the power input terminals, and the first non-insulated chopper circuit and the second non-insulated chopper circuit, on the basis of the type of the input power supply. Thus, this configuration can have the beneficial effect of switching between a dual power factor improvement circuit to suppress harmonic currents when the input power supply is the alternating current power supply, and an interleaving circuit when the input power supply is the direct current power supply, in the same circuit board. In other words, in the case of the direct current power supply, only one circuit operates in the dual scheme. In this case, to output the same rated output power as that when the alternating current power supply is adopted, a conduction loss of the non-insulated chopper circuit has been increased, so that a rated output power of the direct current power supply has been required to be reduced. In contrast, the present invention can have the beneficial effect of allowing a reduction of the conduction loss of the non-insulated chopper circuit, by changing to the interleaving scheme in which circuits are in parallel with the direct current power supply, and thus allowing outputting the same rated output power as that when the alternating current power supply is adopted, even with the use of the direct current power supply.

The present invention provides the switching power supply, in which the first non-insulated chopper circuit has a first input-side node, a first positive-side node connected to a positive side of the power output terminals, and a first negative-side node connected to a negative side of the power output terminals, and the second non-insulated chopper circuit has a second input-side node, a second positive-side node connected to the positive side of the power output terminals, and a second negative-side node connected to the negative side of the power output terminals. The switching circuit is configured to switch between a first connection mode in which the first input-side node is connected to one of the power input terminals and the second input-side node is connected to the other of the power input terminals, and a second connection mode in which the first input-side node and the second input-side node are connected to one of the power input terminals and the first negative-side node and the second negative-side node are connected to the other of the power input terminals.

According to the invention, there is provided the switching circuit configured to switch the circuit between the power input terminals, and the first non-insulated chopper circuit and the second non-insulated chopper circuit, on the basis of the type of the input power supply. Further provided are the two connection modes, i.e., the first connection mode and the second connection mode. Thus, this configuration can have the beneficial effect of switching between a dual power factor improvement circuit to suppress harmonic currents when the input power supply is the alternating current power supply, and an interleaving circuit when the input power supply is the direct current power supply, in the same circuit board. In other words, in the case of the direct current power supply, only one circuit operates in the dual scheme. In this case, to output the same rated output power as that when the alternating current power supply is adopted, a conduction loss of the non-insulated chopper circuit has been increased, so that a rated output power of the direct current power supply has been required to be reduced. In contrast, the present invention can have the beneficial effect of allowing a reduction of the conduction loss of the non-insulated chopper circuit, by changing to the interleaving scheme in which circuits are in parallel with the direct current power supply, and thus allowing outputting the same rated output power as that when the alternating current power supply is adopted, even with the use of the direct current power supply.

The present invention provides the switching power supply, in which the switching circuit is in the first connection mode when the alternating current power supply is connected to the power input terminals, and is in the second connection mode when the direct current power supply is connected to the power input terminals.

According to the invention, there is provided the switching circuit configured to switch the circuit between the power input terminals, and the first non-insulated chopper circuit and the second non-insulated chopper circuit, on the basis of the type of the input power supply. Further provided are the two connection modes, i.e., the first connection mode used when the input power supply is the alternating current power supply and the second connection mode used when the input power supply is the direct current power supply. Thus, this configuration can have the beneficial effect of switching between a dual power factor improvement circuit to suppress harmonic currents when the input power supply is the alternating current power supply, and an interleaving circuit when the input power supply is the direct current power supply, in the same circuit board. In other words, in the case of the direct current power supply, only one circuit operates in the dual scheme. In this case, to output the same rated output power as that when the alternating current power supply is adopted, a conduction loss of the non-insulated chopper circuit has been increased, so that a rated output power of the direct current power supply has been required to be reduced. In contrast, the present invention can have the beneficial effect of allowing a reduction of the conduction loss of the non-insulated chopper circuit, by changing to the interleaving scheme in which circuits are in parallel with the direct current power supply, and thus allowing outputting the same rated output power as that when the alternating current power supply is adopted, even with the use of the direct current power supply.

The present invention provides the switching power supply, in which the first non-insulated chopper circuit includes a first switching element, a first reverse current prevention element, and a first reactor, and the second non-insulated chopper circuit includes a second switching element, a second reverse current prevention element, and a second reactor.

According to the invention, there is provided so-called high efficiency chopper converters, as the first non-insulated chopper circuit and the second non-insulated chopper circuit, and thus, this configuration can have the beneficial effect of suppressing harmonic currents by the power factor improvement circuit having an extremely small number of components.

The present invention provides the switching power supply, in which the first non-insulated chopper circuit constitutes a first serial circuit by serial connection of the first switching element and the first reverse current prevention element, and the first reactor is connected between the first switching element and the first reverse current prevention element.

According to the invention, there is provided the so-called high efficiency voltage boosting chopper converter, as the first non-insulated chopper circuit, and thus, this configuration can have the beneficial effect of suppressing harmonic currents by the power factor improvement circuit having an extremely small number of components.

The present invention provides the switching power supply, in which the second non-insulated chopper circuit constitutes a second serial circuit by serial connection of the second switching element and the second reverse current prevention element, and the second reactor is connected between the second switching element and the second reverse current prevention element.

According to the invention, there is provided the so-called high efficiency voltage boosting chopper converter, as the second non-insulated chopper circuit, and thus, this configuration can have the beneficial effect of suppressing harmonic currents by the power factor improvement circuit having an extremely small number of components.

The present invention provides the switching power supply, in which the switching circuit includes: a first contact provided between one of the power input terminals and the first input-side node, a second contact provided between the other of the power input terminals and the second input-side node, on the side of the other of the power input terminals, a third contact provided between the other of the power input terminals and the second input-side node, on the side of the second input-side node relative to the second contact, and a fourth contact connected to a negative electrode of the smoothing capacitor.

The invention can have, owing to the contacts that can change connection, the beneficial effect of achieving the switching power supply that can switch between an ACDC converter function and a DCDC converter function, by switching the connection, even if the input power supply is any of the alternating current power supply and the direct current power supply.

The present invention provides the switching power supply, in which, when the input power supply is the alternating current power supply, the switching circuit connects the second contact to the third contact, and when the input power supply is the direct current power supply, the switching circuit connects the first contact to the third contact, and connects the second contact to the fourth contact.

The invention can have the beneficial effect of suppressing harmonic currents, when the input power supply is the alternating current power supply, by switching to the dual power factor improvement circuit, while changing to the interleaving circuit configuration having a reduced conduction loss, when the input power supply is the direct current power supply.

The present invention provides the switching power supply, further including a third serial circuit having a third reverse current prevention element and a fourth reverse current prevention element connected to each other in series, and a fourth serial circuit having a fifth reverse current prevention element and a sixth reverse current prevention element connected to each other in series, wherein one end of the third serial circuit and one end of the fourth serial circuit are connected to a positive electrode of the smoothing capacitor, the first contact of the switching circuit and the first non-insulated chopper circuit are connected between the fifth reverse current prevention element and the sixth reverse current prevention element of the fourth serial circuit, the other end of the third serial circuit and the other end of the fourth serial circuit are connected to the negative electrode of the smoothing capacitor, and the third contact of the switching circuit and the second non-insulated chopper circuit are connected between the third reverse current prevention element and the fourth reverse current prevention element of the third serial circuit.

According to the invention, diodes are provided between the negative side of the smoothing capacitor and the input power supply. Thus, this configuration can have the beneficial effect of, when the input power supply is the alternating current power supply, suppressing noise, and protecting the reactors from an abrupt voltage increase because the bypass diodes are provided between the input power supply and the reactors.

The present invention provides the switching power supply, in which the third to sixth reverse current prevention elements constitute a rectifier bridge circuit, in which bridge input terminals are disposed between the fifth reverse current prevention element and the sixth reverse current prevention element of the fourth serial circuit, and between the third reverse current prevention element and the fourth reverse current prevention element of the third serial circuit, and bridge output terminals are disposed between one end of the third serial circuit and one end of the fourth serial circuit, and between the other end of the third serial circuit and the other end of the fourth serial circuit.

The invention can have the beneficial effect of actualizing a diode circuit for noise reduction and reactor protection, by the provision of the one rectifier bridge circuit, i.e., a small number of components.

The present invention provides the switching power supply, in which, when the input power supply is the direct current power supply, the rectifier bridge circuit is disconnected from the power output terminals and the power input terminals.

The invention can have the beneficial effect of saving power consumption, when the input power supply is the direct current power supply, by disconnecting the rectifier bridge circuit.

The present invention provides the switching power supply, in which the power input terminals are connected to bridge input terminals of a rectifier bridge circuit. The first non-insulated chopper circuit has a first input-side node, a first positive-side node connected to a positive side of the power output terminals, and a first negative-side node connected to a negative side of the power output terminals. The second non-insulated chopper circuit has a second input-side node, a second positive-side node connected to the positive side of the power output terminals, and a second negative-side node connected to a negative side of the power output terminals. The switching circuit includes a fifth contact provided between one of the power input terminals and the first input-side node on the side of the one of the power input terminals, a sixth contact provided between the one of power input terminals and the first input-side node on the side of the first input-side node, a seventh contact provided between the other of the power input terminals and the second input-side node on the side of the other of the power input terminals, an eighth contact provided between the other of the power input terminals and the second input-side node on the side of the second input-side node relative to the seventh contact, a ninth contact provided at one of the bridge output terminals of the rectifier bridge circuit, and a tenth contact connected to the other of the bridge output terminals of the rectifier bridge circuit and a negative electrode of the smoothing capacitor. When the input power supply is the alternating current power supply, the fifth contact is connected to the sixth contact, and the seventh contact is connected to the eighth contact. When the input power supply is the direct current power supply, the fifth contact is connected to the sixth contact, the sixth contact is connected to the eighth contact, and the seventh contact is connected to the tenth contact. When the input power supply is any of the alternating current power supply and the direct current power supply, the sixth contact is connected to the ninth contact, and the sixth contact is connected to the eighth contact.

According to the invention, there is provided the switching circuit configured to switch the circuit between the power input terminals, and the first non-insulated chopper circuit and the second non-insulated chopper circuit, on the basis of the type of the input power supply, and thus, this configuration can have the beneficial effect of switching between a dual power factor improvement circuit to suppress harmonic currents when the input power supply is the alternating current power supply, and an interleaving circuit when the input power supply is the direct current power supply, in the same circuit board. In other words, in the case of the direct current power supply, only one circuit operates in the dual scheme. In this case, to output the same rated output power as that when the alternating current power supply is adopted, a conduction loss of the non-insulated chopper circuit have been increased, so a rated output power of the direct current power supply has been required to be reduced. In contrast, the present invention can have the beneficial effect of allowing a reduction of the conduction loss of the non-insulated chopper circuit, by changing to the interleaving scheme in which circuits are in parallel with the direct current power supply, and thus allowing outputting the same rated output power as that when the alternating current power supply is adopted, even with the use of the direct current power supply. The present invention can also have the beneficial effect of actualizing a diode circuit for noise reduction and reactor protection, by the provision of the one rectifier bridge circuit, i.e., a small number of components. The switching circuit can also have the beneficial effect of allowing switching to the interleaving circuit, even if the input power supply is the alternating current power supply.

The present invention provides the switching power supply, further including a detection unit configured to detect whether the input power supply is the alternating current power supply or the direct current power supply, and a control unit configured to control in accordance with the first connection mode or the second connection mode on the basis of a detection signal of the detection unit.

According to the invention, since the detection unit is provided to detect whether the input power supply is the alternating current power supply or the direct current power supply, the switching power supply can have the beneficial effect of appropriately switching the switching circuit in accordance with the grasp of the type of the input power supply.

The present invention provides the switching power supply, in which the switching circuit switches the circuit using conductive members.

The invention can have the significantly beneficial effect of switching between a dual power factor improvement circuit to suppress harmonic currents when the input power supply is the alternating current power supply, and an interleaving voltage boosting circuit when the input power supply is the direct current power supply, in the same circuit board, by changing connection arrangement of the conductive members.

The present invention provides a switching power supply including: power input terminals to which a direct current power supply or an alternating current power supply is connected; power output terminals configured to output electric power; a smoothing capacitor connected between the power output terminals; a first non-insulated chopper circuit connected between the power output terminals; a second non-insulated chopper circuit connected between the power output terminals; and a switching circuit configured to switch a connection circuit provided between the first non-insulated chopper circuit and the second non-insulated chopper circuit, and the power input terminals using conductive members. The switching circuit switches the connection of the power input terminals, the first non-insulated chopper circuit, and the second non-insulated chopper circuit between an ACDC converter mode in a dual boost scheme and a DCDC converter mode in an interleaving voltage boost scheme.

The invention can have the beneficial effect of switching a dual circuit used as a high efficiency power factor improvement circuit, when the input power supply is the alternating current power supply, into an interleaving circuit having a reduced conduction loss, when the input power supply is the direct current power supply, by changing the connection circuit using the conductive members.

The switching power supply according to the present invention can switch the dual circuit used as the high efficiency power factor improvement circuit when the input power supply is the alternating current power supply, into the interleaving circuit having a reduced conduction loss when the input power supply is the direct current power supply.

DETAILED DESCRIPTION OF THE PREFERRED EMBODIMENTS

Figure 1:
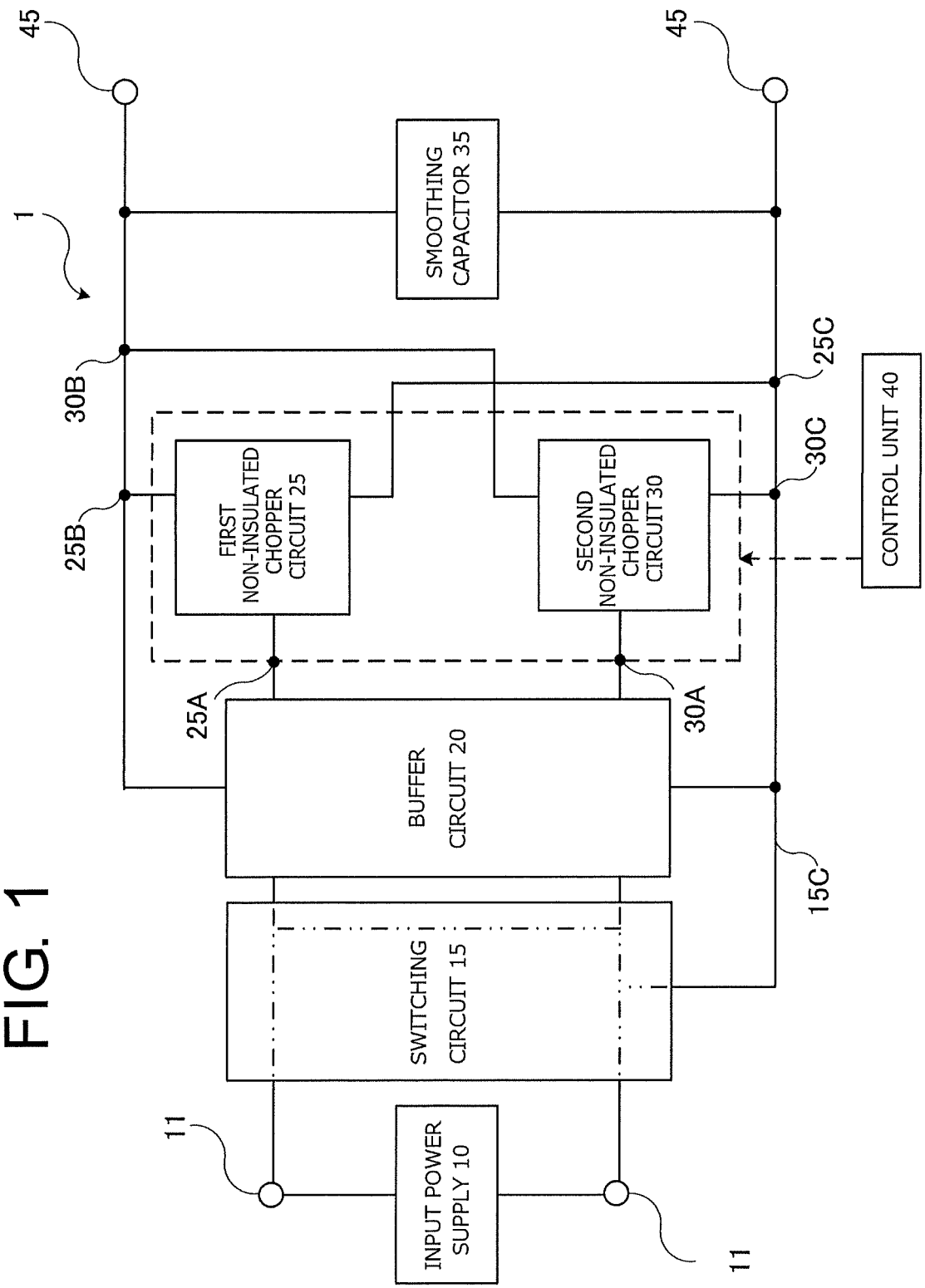
FIG. 1 is a block diagram of a switching power supply according to a first embodiment of the present invention.

Embodiments of the present invention will be described below with reference to the accompanying drawings.

FIGS. 1 to 6 are examples embodying the present invention, and identical components are indicated with the same reference numerals in the drawings. In each of the drawings, configuration is partly omitted for the sake of simplicity of the drawing. The sizes, shapes, thicknesses, and the like of components are appropriately emphasized in the drawings.

FIG. 1 is a block diagram of a switching power supply 1 according to a first embodiment of the present invention. The switching power supply 1 includes an input power supply 10 that is an alternating current power supply or a direct current power supply, a pair of power input terminals 11 to which the input power supply 10 is connected, power output terminals 45 configured to output electric power, and a smoothing capacitor 35 connected between the power output terminals 45.

In the switching power supply 1, a buffer circuit 20 is connected between the power output terminals 45. The buffer circuit 20 is connected to the power input terminals 11 to perform rectification when the input power supply 10 is the alternating current power supply. Furthermore, the buffer circuit 20 has a current bypassing function in saturation of a reactor, a noise preventing function, and a protecting function as a bypass diode, as described below. The buffer circuit 20 is preferably connected in parallel with the smoothing capacitor 35. The buffer circuit 20 is preferably constituted of, for example, a rectifier bridge circuit formed from a plurality of diodes having a pair of input terminals connected to the power input terminals 11 and a pair of output terminals connected to the power output terminals 45, but may have another configuration. The buffer circuit 20 and the smoothing capacitor 35 are provided with a first non-insulated chopper circuit 25 and a second non-insulated chopper circuit 30.

Between the input power supply 10 and the buffer circuit 20, a switching circuit 15 is provided. The switching circuit 15 switches a connection circuit provided between the first non-insulated chopper circuit 25 and the second non-insulated chopper circuit 30, and both terminals of the input power supply 10 on the basis of whether the input power supply 10 is a direct current power supply or an alternating current power supply. The switching circuit 15 is a circuit that mechanically switches electrical continuity by connecting or disconnecting conductive members, which are referred to as so-called short pieces, jumpers, jumper elements, or the like, to or from holes of a circuit board. The switching circuit 15 may be a relay that can control electrical continuity from outside.

The first non-insulated chopper circuit 25 is a so-called chopper circuit, such as a voltage boosting chopper or a voltage reducing chopper, having no insulated configuration component such as a transformer. Here, the first non-insulated chopper circuit 25 includes a first switching element, a first reverse current prevention element (first diode), and a first reactor, and is connected between the power output terminals 45. The second non-insulated chopper circuit 25 includes a second switching element, a second reverse current prevention element (second diode), and a second reactor, and is connected between the power output terminals 45. Note that, the second non-insulated chopper circuit 30 has the same configuration as that of the first non-insulated chopper circuit 25.

The first reverse current prevention element and the second reverse current prevention element may be any element as long as they have the function of passing currents in one direction, while blocking currents in the reverse direction. Although diodes are typically used, switching elements such as FETs (field effect transistors) may be used to perform the same functions.

The first switching element (for example, which refers to a first switching element 92 of FIG. 3A, as described later) provided in the first non-insulated chopper circuit 25 and a second switching element (for example, which refers to a second switching element 94 of FIG. 3A, as described later) provided in the second non-insulated chopper circuit 30 perform switching operation by control of a control unit 40.

The first switching element and the second switching element each are, for example, an FET. As a matter of course, the first switching element and the second switching element may each be an IGBT (insulated gate bipolar transistor).

The control unit 40 is constituted of a CPU, a RAM, a ROM, and the like, and performs various types of control. The CPU, i.e., a central processing unit, performs various functions by execution of various programs. The RAM is used as a working area and a memory area of the CPU. The ROM stores an operating system and programs to be executed by the CPU. As a matter of course, the control unit 40 may have limited functions. For example, the control unit 40 may be an electronic circuit configured to cause the first non-insulated chopper circuit and the second non-insulated chopper circuit to operate as, for example, a voltage boosting circuit, a voltage reducing circuit, or a voltage boosting and reducing circuit by detecting the voltage of the input power supply 10 and appropriately switching the first switching element and the second switching element.

The first non-insulated chopper circuit 25 has a first input-side terminal (node) 25A connected to the switching circuit 15, a first positive-side terminal (node) 25B connected to a positive side of the smoothing capacitor 35 (power output terminal 45), and a first negative-side terminal (node) 25C connected to a negative side of the smoothing capacitor 35 (power output terminal 45). In the first non-insulated chopper circuit 25, the first input-side terminal 25A is disposed between the first switching element and the first reverse current prevention element, the first positive-side terminal 25B is disposed on the side of a cathode of the first reverse current prevention element, and the first negative-side terminal 25C is disposed on the side of the first switching element.

The second non-insulated chopper circuit 30 has a second input-side terminal (node) 30A connected to the switching circuit 15, a second positive-side terminal (node) 30B connected to a positive side of the smoothing capacitor 35 (power output terminals 45), and a second negative-side terminal (node) 30C connected to a negative side of the smoothing capacitor 35 (power output terminals 45). In the second non-insulated chopper circuit 30, the second input-side terminal 30A is disposed between the second switching element and the second reverse current prevention element, the second positive-side terminal 30B is disposed on the side of a cathode of the second reverse current prevention element, and the second negative-side terminal 30C is disposed on the side of the second switching element.

The switching circuit 15 includes a negative-side shortcut circuit 15C connected to the first and second negative-side terminals 25C and 30C of the first and second non-insulated chopper circuits 25 and 30.

When the input power supply 10 is an alternating current power supply, the switching circuit 15 connects the first input-side terminal 25A to one side of the input power supply 10, and connects the second input-side terminal 30A to the other side of the input power supply 10, and disconnects the negative-side shortcut circuit 15C. As a result, each of the first and second non-insulated chopper circuits 25 and 30 can operate as a so-called PFC circuit, thus configuring a dual boost ACDC converter circuit.

When the input power supply 10 is a direct current power supply, the switching circuit 15 connects both of the first input-side terminal 25A and the second input-side terminal 30A to a positive side of the input power supply 10, and disconnects the second input-side terminal 30A from a negative side of the input power supply 10. At the same time, the switching circuit 15 also connects both of the first and second negative-side terminals 25C and 30C to the negative side of the input power supply 10 through the negative-side shortcut circuit 15C. As a result, each of the first and second non-insulated chopper circuits 25 and 30 can operate as a so-called interleaving voltage boosting chopper circuit. An embodiment of the connection relationship will be described later with reference to FIGS. 3A and 3B.

In other words, in the switching power supply 1 according to the first embodiment, the first non-insulated chopper circuit 25 has the first input-side node 25A connected to one side of the input power supply 10, the first positive-side node 25B connected to the positive side of the power output terminals 45, and the first negative-side node 25C connected to the negative side of the power output terminals 45. The second non-insulated chopper circuit 30 has the second input-side node 30A connected to the other side of the input power supply 10, the second positive-side node 30B connected to the positive side of the power output terminals 45, and the second negative-side node 30C connected to the negative side of the power output terminals 45. The switching circuit 15 switches between a first connection mode in which the first input-side node 25A is connected to one of the power input terminals 11 and the second input-side node 30A is connected to the other of the power input terminals 11, and a second connection mode in which the first input-side node 25A and the second input-side node 30A are connected to the one of the power input terminals 11 and the first negative-side node 25C and the second negative-side node 30C are connected to the other of the power input terminals 11.

The switching circuit 15 of the switching power supply 1 according to the first embodiment is in the first connection mode when the alternating current power supply is connected to the power input terminals 11 as the input power supply 10. The switching circuit 15 is in the second connection mode when the direct current power supply is connected to the power input terminals 11 as the input power supply 10.

As described above, the switching power supply 1 according to the first embodiment of the present invention is provided with the switching circuit 15 that switches the connection circuit provided between the first non-insulated chopper circuit 25 and the second non-insulated chopper circuit 30, and the input power supply 10, on the basis of whether the input power supply 10 is the direct current power supply or the alternating current power supply. Thus, the switching power supply 1 according to the first embodiment of the present invention can have the beneficial effect of switching between a dual boost power factor improvement circuit to suppress harmonic currents when the input power supply 10 is the alternating current power supply, and an interleaving voltage boosting circuit when the input power supply 10 is the direct current power supply, in the same circuit board. In other words, in the case of the direct current power supply, only one of the non-insulated chopper circuits operates in the dual scheme. In this case, to output the same rated output power as that when the alternating current power supply is adopted, a conduction loss of the non-insulated chopper circuit has been increased, so that a rated output power of the direct current power supply has been required to be reduced. In contrast, the present invention can have the beneficial effect of allowing a reduction of the conduction loss of the non-insulated chopper circuit, by changing to the interleaving scheme in which the plurality of non-insulated chopper circuits are connected in parallel to one end of the direct current power supply, and thus allowing outputting the same rated output power as that when the alternating current power supply is adopted, even with the use of the direct current power supply.

Figure 2A:
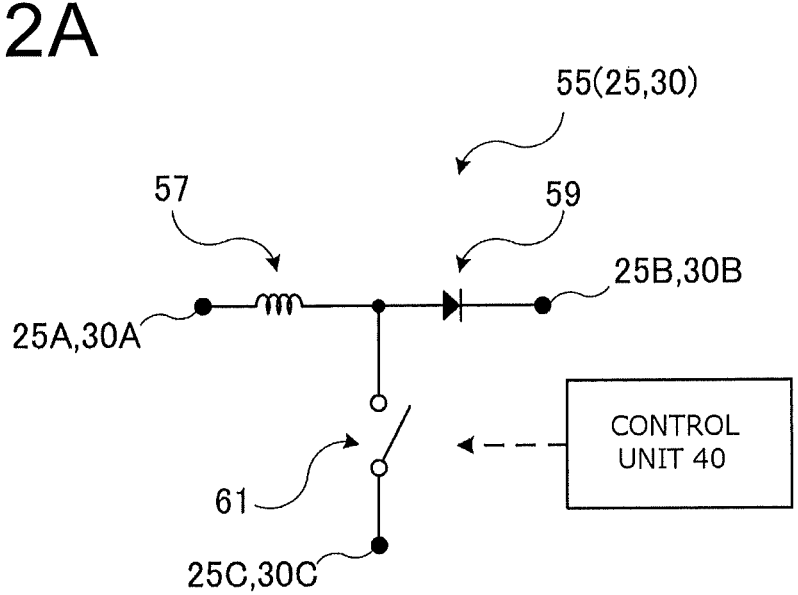
FIG. 2A is a circuit diagram of a voltage boosting circuit.

FIG. 2A is a circuit diagram of a voltage boosting circuit 55 that is preferable as the first or second non-insulated chopper circuit 25 or 30. The voltage boosting circuit 55 includes a reactor 57, a switching element 61, and a diode 59. The control unit 40 controls a voltage boosting operation of the switching element 61. The reactor 57 and the diode 59 are connected to each other in series. More specifically, one end of the reactor 57 is connected to an anode terminal of the diode 59, and the switching element 61 is connected to the node.

The reactor 57 has the first or second input-side terminal 25A or 30A. The diode 59 has the first or second positive-side terminal 25B or 30B at its cathode-side terminal. The switching element 61 has the first or second negative-side terminal 25C or 30C. Upon application of a voltage to the other end (first or second input-side terminal 25A or 30A) of the reactor 57, a voltage boosting function is performed by a switching operation of the switching element 61. This is a well known technology, so that a description thereof is omitted here.

Figure 2B:
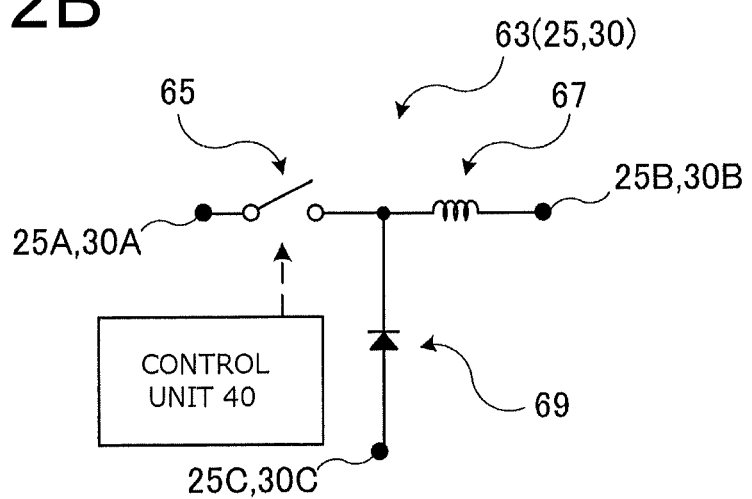
FIG. 2B is a circuit diagram of a voltage reducing circuit.

FIG. 2B is a circuit diagram of a voltage reducing circuit 63, which is another preferable example of each of the first and second non-insulated chopper circuits. The voltage reducing circuit 63 includes a switching element 65, a reactor 67, and a diode 69. The control unit 40 controls a voltage reducing operation of the switching element 65. The switching element 65 and the reactor 67 are connected to each other in series. The diode 69 is connected to the node between the switching element 65 and the reactor 67, at its cathode-side terminal. The switching element 65 has the first or second input-side terminal 25A or 30A. The reactor 67 has the first or second positive-side terminal 25B or 30B. The diode 69 has the first or second negative-side terminal 25C or 30C at its anode-side terminal. Upon application of a voltage to one end (first or second input-side terminal 25A or 30A) of the switching element 65, a voltage reducing function is performed by a switching operation of the switching element 65. This is a well known technology, so that a description thereof is omitted here.

Next, the specific circuit configuration of the switching power supply 1 according to the first embodiment will be described with reference to FIGS. 3A and 3B.

Figure 3A:
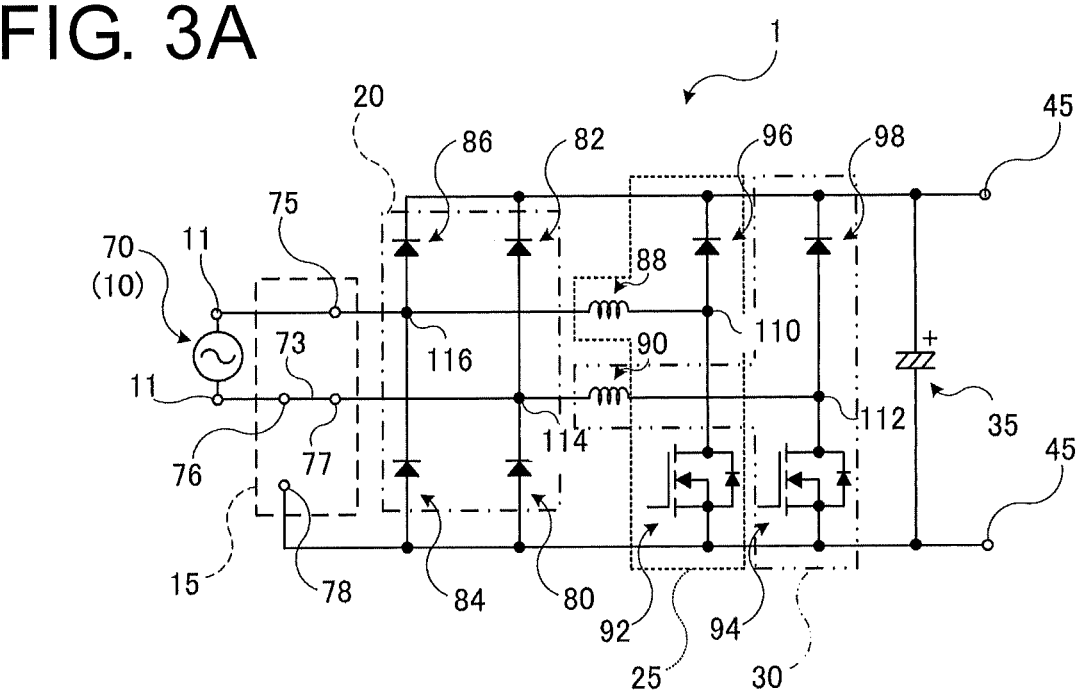
FIG. 3A is a circuit diagram of the switching power supply in which a switching circuit is connected so as to constitute a dual boost power factor improvement circuit, when an input power supply is an alternating current power supply.

FIG. 3A is a circuit diagram of the switching power supply 1 to which the switching circuit 15 is connected to constitute a dual boost power factor improvement circuit used when the input power supply 10 is an alternating current power supply 70.

In FIG. 3A, the alternating current power supply 70 is connected as the input power supply 10 to the switching power supply 1 of FIG. 1, and the voltage boosting circuit illustrated in FIG. 2A is applied as each of the first non-insulated chopper circuit 25 (enclosed by dotted lines in FIG. 3A) and the second non-insulated chopper circuit 30 (enclosed by alternate long and two short dashed lines in FIG. 3A).

The switching circuit 15 (enclosed by broken lines in FIG. 3A) includes four contacts, i.e., a first contact 75, a second contact 76, a third contact 77, and a fourth contact 78. The second contact 76 and the third contact 77 are connected through a first connection wire 73. Note that the fourth contact 78 is in an open state.

The buffer circuit 20 (enclosed by alternate long and short dashed lines in FIG. 3A) includes a third diode 80, a fourth diode 82, a fifth diode 84, and a sixth diode 86. An anode terminal of the sixth diode 86 is connected to a cathode terminal of the fifth diode 84, and a fourth node 116, which is a node therebetween, is connected to one end of the alternating current power supply 70 and one end of a first reactor 88 of the first non-insulated chopper circuit 25 to be described later. A cathode terminal of the sixth diode 86 is connected to the positive side of the smoothing capacitor 35. An anode terminal of the fifth diode 84 is connected to the negative side of the smoothing capacitor 35. The fourth diode 82 and the third diode 80 are connected to each other in series, and a third node 114, which is a node therebetween, is connected to the other end of the alternating current power supply 70 and one end of a second reactor 90 of the second non-insulated chopper circuit 30 to be described later. A cathode terminal of the fourth diode 82 is connected to the positive side of the smoothing capacitor 35, and an anode terminal of the third diode 80 is connected to the negative side of the smoothing capacitor 35.

The first non-insulated chopper circuit 25 includes the first reactor 88, a first diode 96, and a first switching element 92. The first reactor 88 is connected to an anode terminal of the first diode 96, and a first node 110, which is a node therebetween, is connected to the other end of the first reactor 88 on an opposite side of the alternating current power supply 70. One end of the first switching element 92 not on the side of the first node 110 is connected to the negative side of the smoothing capacitor 35, and a cathode terminal of the first diode 96 is connected to the positive side of the smoothing capacitor 35. The first switching element 92 functions as a voltage boosting circuit by control of the control unit 40 (not illustrated).

The second non-insulated chopper circuit 30 includes the second reactor 90, a second diode 98, and a second switching element 94. The second reactor 90 is connected to an anode terminal of the second diode 98, and a second node 112, which is a node therebetween, is connected to the other end of the second reactor 90 not on the side of the alternating current power supply 70. One end of the second switching element 94 not on the side of the second node 112 is connected to the negative side of the smoothing capacitor 35, and a cathode terminal of the second diode 98 is connected to the positive side of the smoothing capacitor 35. The second switching element 94 functions as a voltage boosting circuit by control of the control unit 40 (not illustrated).

In other words, the first non-insulated chopper circuit 25 constitutes a first serial circuit by serial connection of the first switching element 92 and the first reverse current prevention element 96, and the other end of the first reactor 88 is connected between the first switching element 92 and the first reverse current prevention element 96 in the first serial circuit. The second non-insulated chopper circuit 30 constitutes a second serial circuit by serial connection of the second switching element 94 and the second reverse current prevention element 98, and the other end of the second reactor 90 is connected between the second switching element 94 and the second reverse current prevention element 98 in the second serial circuit.

The switching circuit 15 includes the first contact 75 provided between one of the power input terminals 11 and the first non-insulated chopper circuit 25, the second contact 76 provided between the other of the power input terminals 11 and the second non-insulated chopper circuit 30 on the side of the other of the power input terminals 11, the third contact 77 provided between the other of the power input terminals 11 and the second non-insulated chopper circuit 30 on the side of the second non-insulated chopper circuit 30 relative to the second contact 76, and the fourth contact 78 connected to a negative electrode of the smoothing capacitor 35.

The first non-insulated chopper circuit 25 and the second non-insulated chopper circuit 30 constitute a so-called dual boost power factor improvement circuit by appropriate control by the control unit 40. Although the description of this control is omitted because it is a well known technology, this control has the beneficial effect of suppressing harmonic currents. The so-called voltage boosting chopper converter is illustrated as an example of the PFC circuit, but another PFC circuit may be used instead.

Next, the configuration of a changed circuit and the effect thereof, by operation of the switching circuit 15, will be described with reference to FIG. 3B. Note that, the switching circuit 15 may be switched from the state of FIG. 3B to the state of FIG. 3A.

Figure 3B:
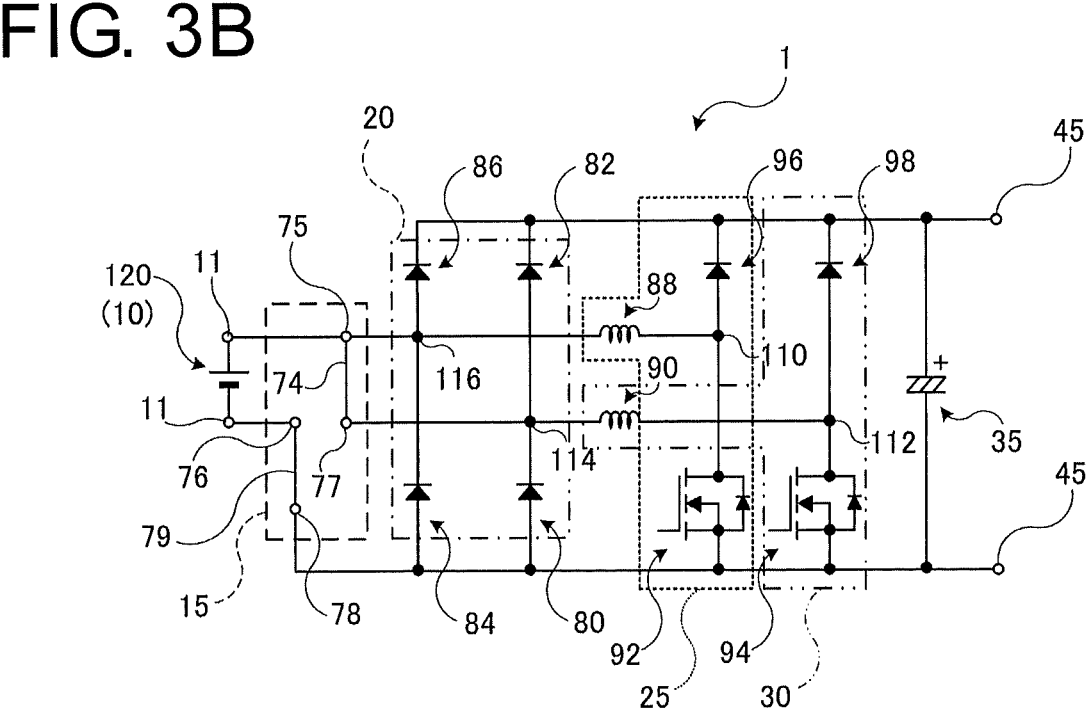
FIG. 3B is a circuit diagram of the switching power supply in which the switching circuit is connected so as to constitute an interleaving voltage boosting circuit, when the input power supply is a direct current power supply.

FIG. 3B is a circuit diagram in which the switching circuit 15 (enclosed by broken lines in FIG. 3B) is connected so as to constitute an interleaving voltage boosting circuit when the input power supply 10 is a direct current power supply 120.

In FIG. 3B, the direct current power supply 120 is connected as the input power supply 10 to the switching power supply 1 of FIG. 1, and the voltage boosting circuit illustrated in FIG. 2A is used as each of the first non-insulated chopper circuit 25 (enclosed by dotted lines in FIG. 3B) and the second non-insulated chopper circuit 30 (enclosed by alternate long and two short dashed lines in FIG. 3B).

In the switching circuit 15, the four contacts, i.e., the first contact 75, the second contact 76, the third contact 77, and the fourth contact 78 are connected in a different manner from that in FIG. 3A. The second contact 76 and the third contact 77 are disconnected (the first connection wire 73 is removed), and the first contact 75 and the third contact 77 are connected through a second connection wire 74. The second contact 76 and the fourth contact 78 are connected through a third connection wire 79.

The configuration of FIG. 3B is the same as that of FIG. 3A, except for the switching circuit 15, so that the description thereof is omitted. In the above-described configuration of the switching circuit 15, the input terminals of the first non-insulated chopper circuit 25 and the second non-insulated chopper circuit 30 are disposed in parallel to the direct current power supply 120. By changing the circuit to that in an interleaving scheme in which the plurality of non-insulated chopper circuits are connected in parallel to one end of the direct current power supply, it is possible to output the same rated output power as that when the alternating current power supply is adopted, even with the use of the direct current power supply.

Figure 7A:
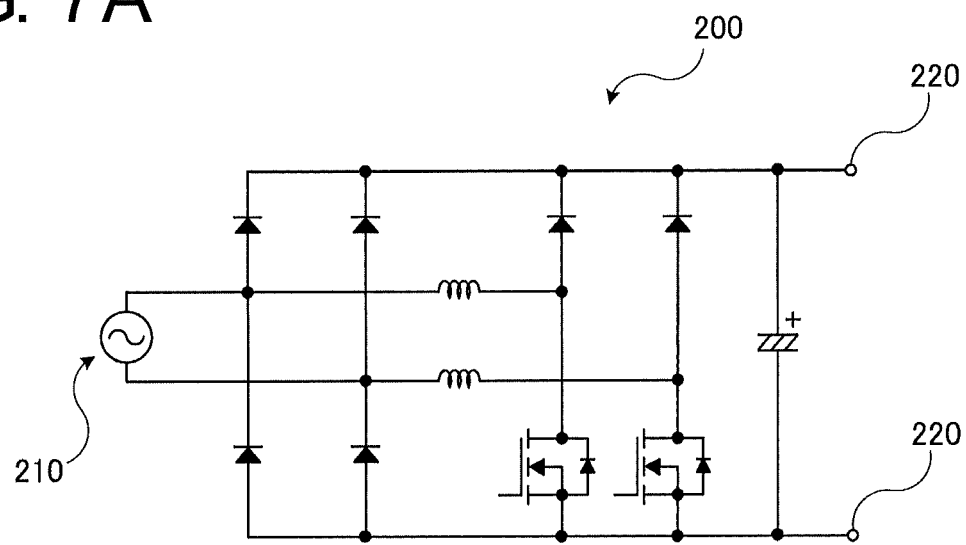
FIG. 7A is a circuit diagram of a switching power supply having a dual boost circuit, i.e., a high efficiency PFC circuit.
Figure 7B:
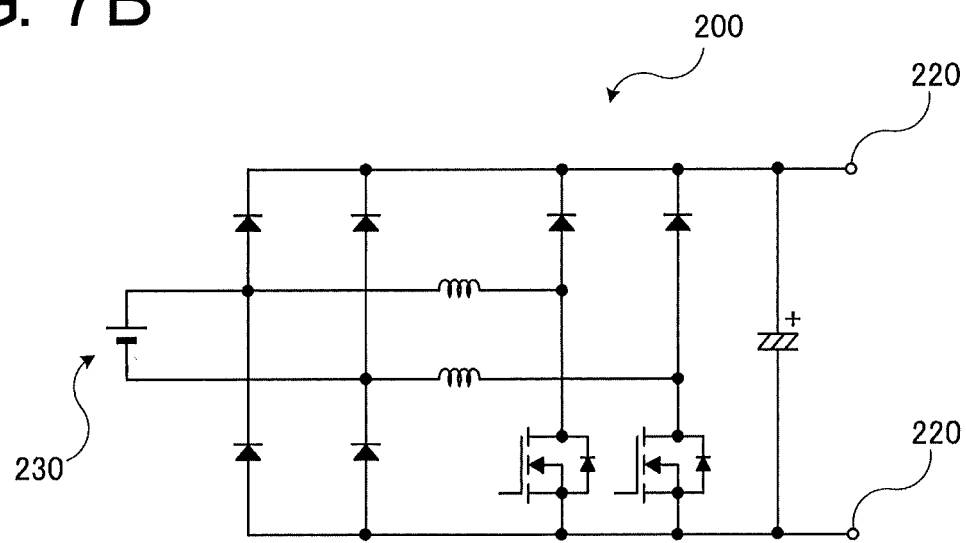
FIG. 7B is a circuit diagram in the case of connecting a direct current power supply to the dual boost circuit, as an input power supply.

This is because of the following reason. In FIG. 3A, if the alternating current power supply 70 is replaced with the direct current power supply 120 of FIG. 3B (refer to FIG. 7B), the direct current power supply 120 can basically operate only one non-insulated chopper circuit in the dual scheme. Accordingly, to output the same rated output power as that when the alternating current power supply is adopted, a conduction loss of the non-insulated chopper circuit has been increased, so that a rated output power of the direct current power supply has been required to be reduced. In contrast, since the switching circuit 15 changes the connection circuit as illustrated in FIG. 3B, the conduction loss of the non-insulated chopper circuit can be reduced, thus allowing outputting the same rated output power as that when the alternating current power supply is adopted, even with the use of the direct current power supply.

According to the switching power supply 1 of the first embodiment of the present invention, there is provided the switching circuit 15 configured to switch the connection circuit provided between the first non-insulated chopper circuit 25 and the second non-insulated chopper circuit 30, and the input power supply 10, on the basis of whether the input power supply 10 is the alternating current power supply or the direct current power supply. Thus, this configuration can have the beneficial effect of switching between the dual boost power factor improvement circuit to suppress harmonic currents when the input power supply 10 is the alternating current power supply 70, and the interleaving circuit when the input power supply 10 is the direct current power supply 120, in the same circuit board.

According to the switching power supply 1 of the first embodiment of the present invention, there is provided the so-called high efficiency voltage boosting chopper converters in the first non-insulated chopper circuit 25 and the second non-insulated chopper circuit 30. Thus, this configuration can have the beneficial effect that, when the input power supply 10 is the alternating current power supply 70, allows suppressing harmonic currents using the power factor improvement circuit having an extremely small number of components.

The switching power supply 1 of the first embodiment of the present invention has the contacts, i.e., the first contact 75, the second contact 76, the third contact 77, and the fourth contact 78, to switch connection. Thus, this configuration can have the beneficial effect that mechanically switches the connection to allow for providing a switching power supply capable of switching between the ACDC converter function and the DCDC converter function, even with the use of the high power input power supply 10.

According to the switching power supply 1 of the first embodiment of the present invention, since the diodes are provided between the negative side of the smoothing capacitor and the input power supply, when the input power supply 10 is the alternating current power supply 70, the switching power supply 1 can have the beneficial effect of suppressing noise. Since the bypass diodes are provided between the input power supply 10, and the first reactor 88 and the second reactor 90, the switching power supply 1 can have the beneficial effect of protecting the reactors from an abrupt voltage increase.

The switching power supply 1 according to the first embodiment of the present invention includes the power input terminal 11 to which the direct current power supply or the alternating current power supply is connected, the power output terminals 45 connected to an external load, the smoothing capacitor 35 connected between the power output terminals 45, the first non-insulated chopper circuit 25 connected between the power output terminals 45, the second non-insulated chopper circuit 30 connected between the power output terminals 45, and the switching circuit 15 configured to switch the connection circuit between the first non-insulated chopper circuit 25 and the second non-insulated chopper circuit 30, and the power input terminals 11 using the conductive members. The switching circuit 15 switches connection of the power input terminals 11 and the first and second non-insulated chopper circuit 25 and 30 between an ACDC converter mode in a dual boost scheme and a DCDC converter mode in an interleaving voltage boosting scheme.

The switching power supply 1 according to the first embodiment of the present invention can have the beneficial effect of changing the dual circuit used as the high efficiency power factor improvement circuit when the input power supply is the alternating current power supply, into the interleaving circuit having a reduced conduction loss when the input power supply is the direct current power supply, by changing connection of wires using the conductive members.

Figure 4:
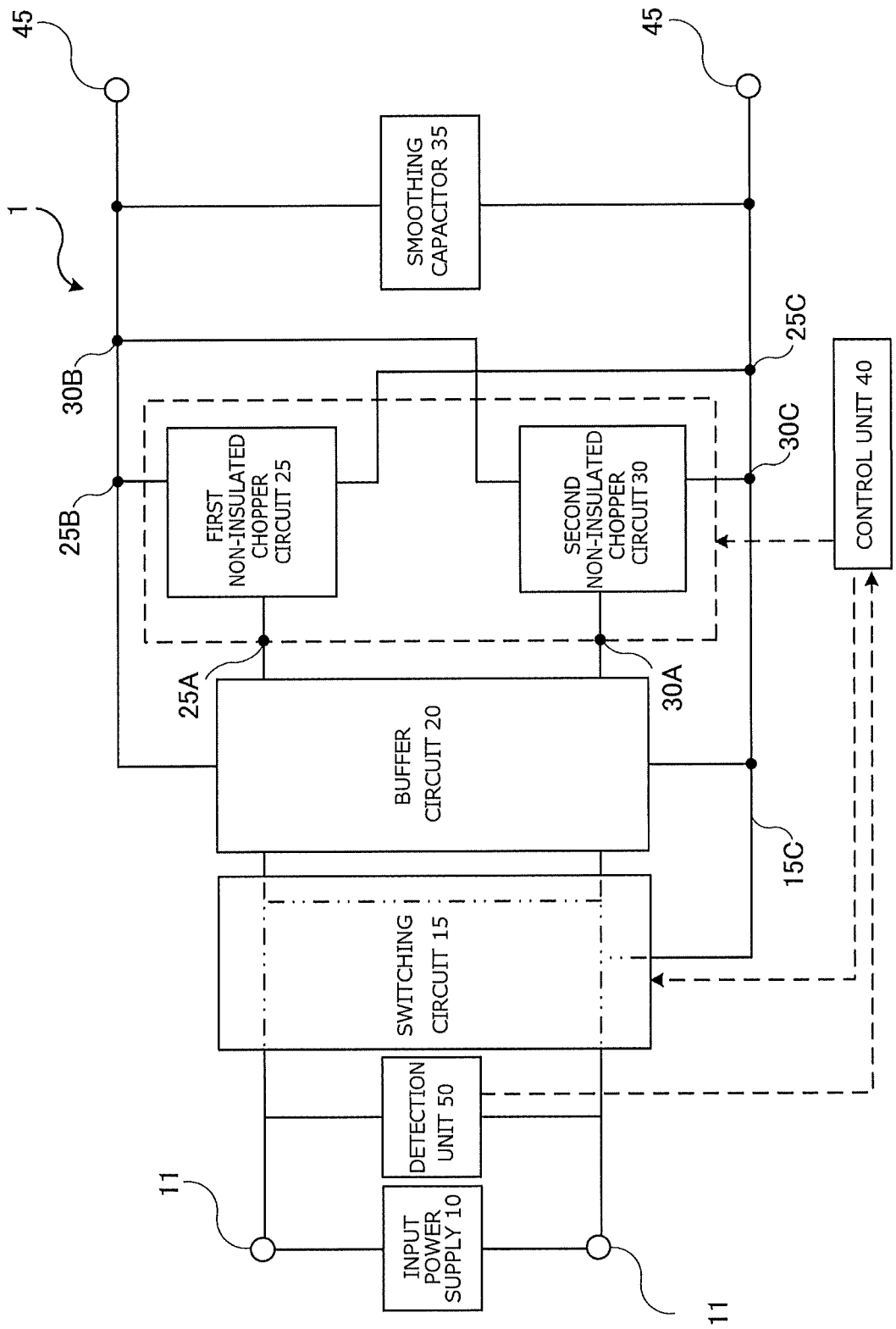
FIG. 4 is a block diagram of a switching power supply according to a second embodiment of the present invention.

FIG. 4 is a block diagram of a switching power supply according to a second embodiment of the present invention. The switching power supply 1 further includes a detection unit 50 that detects whether the input power supply 10 is the alternating current power supply 70 or the direct current power supply 120. The other configuration is the same as that of the first embodiment, so a description thereof is omitted.

According to the switching power supply 1 of the second embodiment of the present invention, since the detection unit 50 detects whether the input power supply 10 is the alternating current power supply 70 or the direct current power supply 120, the switching power supply 1 can have the beneficial effect of appropriately switching the switching circuit 15 in accordance with the grasp of the type of the input power supply 10. For example, the detection unit 50 detects whether the input power supply 10 is the alternating current power supply or the direct current power supply, and sends the detection information to the control unit 40. Thus, the control unit 40 can automatically switch the switching circuit 15. At this time, the switching circuit 15 can use a relay and the like that can be controlled by the control unit 40.

Note that the switching power supply according to the present invention is not limited to the above-described embodiments, and can be variously modified without departing from the scope of the gist of the present invention, as a matter of course.

Figure 5A:
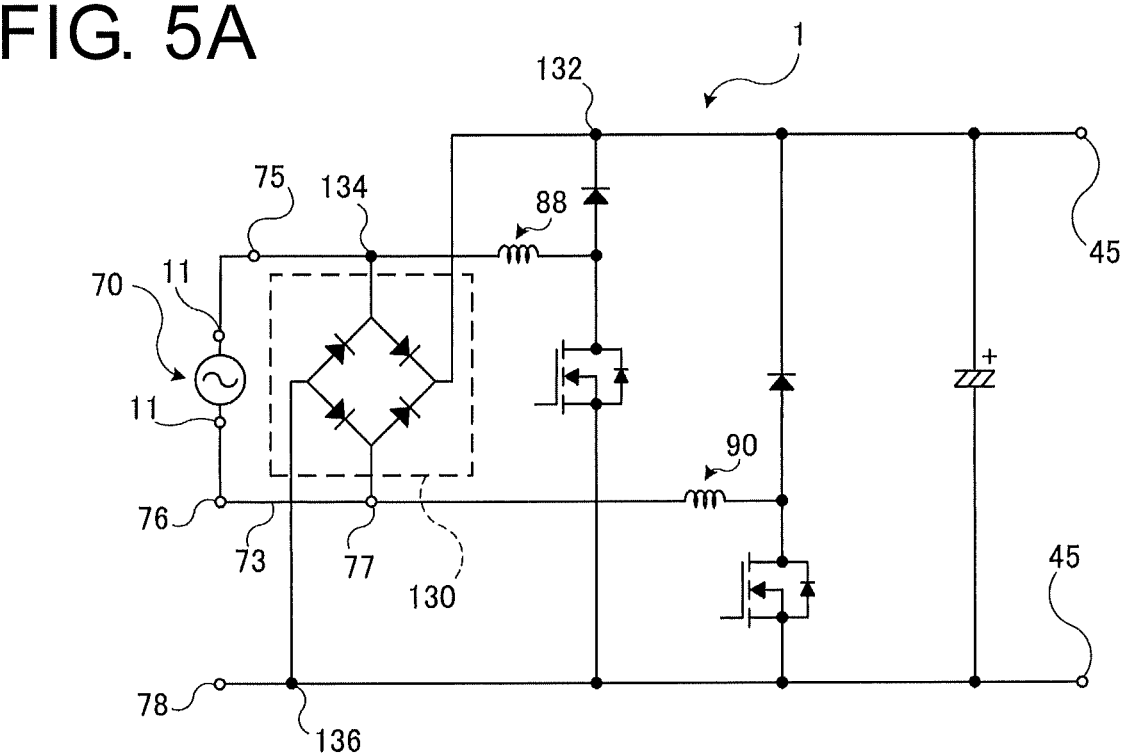
FIG. 5A is a circuit diagram in which a diode circuit is replaced with a rectifier bridge circuit in a dual boost scheme when the input power supply is the alternating current power supply.

For example, as illustrated in FIG. 5A, in the dual boost scheme applied when the input power supply 10 is the alternating current power supply 70, the buffer circuit 20 may be replaced with a rectifier bridge circuit 130 (bridge diodes).

In other words, the third to sixth reverse current prevention elements 80 to 86 compose a rectifier bridge circuit. In the rectifier bridge circuit, bridge input terminals are disposed between the fifth reverse current prevention element 84 and the sixth reverse current prevention element 86, and between the third reverse current prevention element 80 and the fourth reverse current prevention element 82. Bridge output terminals are disposed between the third reverse current prevention element 80 and the fifth reverse current prevention element 84, and between the fourth reverse current prevention element 82 and the sixth reverse current prevention element 86 (refer to FIG. 3A or 3B).

FIG. 5A is basically the same circuit as that in FIG. 3A, but replacing the buffer circuit 20 with the rectifier bridge circuit 130 (bridge diodes) can have the effect of reducing the number of components used.

Figure 5B:
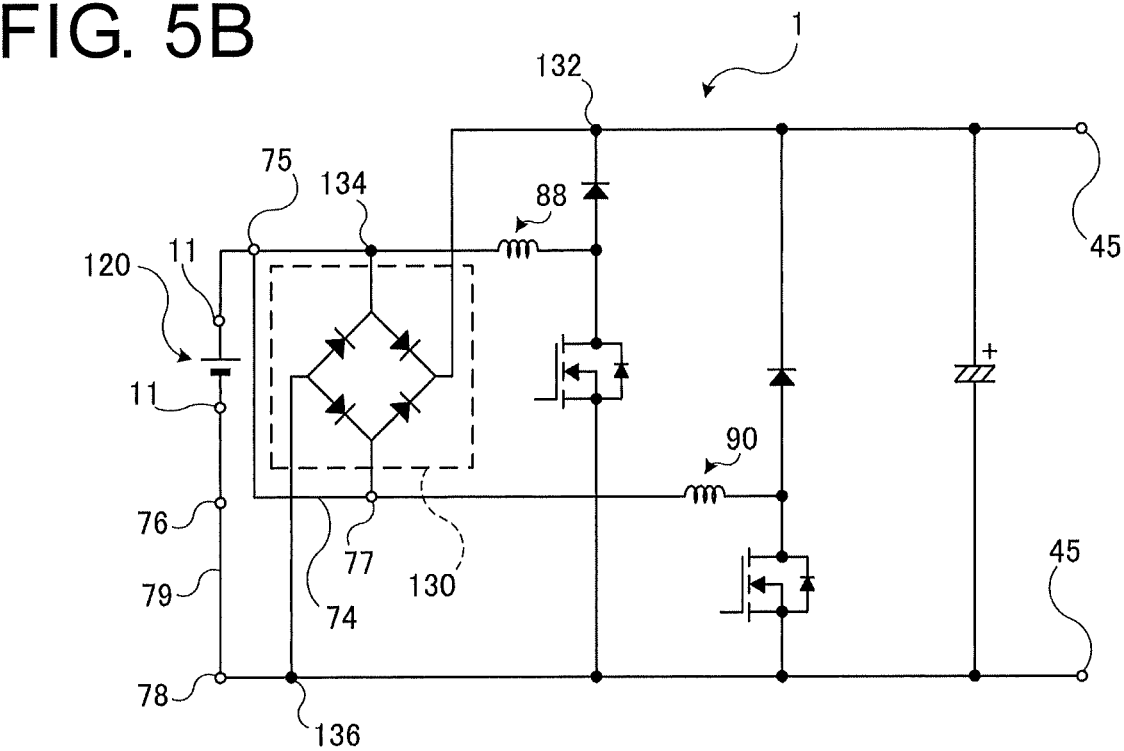
FIG. 5B is a circuit diagram in which the diode circuit is replaced with the rectifier bridge circuit in an interleaving scheme when the input power supply is the direct current power supply.

FIG. 5B is a circuit diagram in which the buffer circuit 20 is replaced with the rectifier bridge circuit 130, in the interleaving scheme applied when the input power supply 10 is the direct current power supply 120. FIG. 5B is basically the same circuit as that in FIG. 3B, but replacing the buffer circuit 20 with the rectifier bridge circuit 130 (bridge diodes) can have the effect of reducing the number of components used.

In the case of the direct current power supply 120, the rectifier bridge circuit 130 can be easily disconnected from the circuit. Specifically, when the input power supply 10 is the direct current power supply 120, the rectifier bridge circuit 130 can be completely disconnected from the voltage boosting circuit for the direct current power supply with ease, by disconnecting a wire between a sixth node 134 for connecting the positive terminal of the direct current power supply 120 to the first reactor 88 and the rectifier bridge circuit 130, a wire between the third contact 77 for connecting the positive terminal of the direct current power supply 120 to the second reactor 90 and the rectifier bridge circuit 130, and connection portions for connecting the power output terminals 45 to the rectifier bridge circuit 130, e.g., a wire between a fifth node 132 and the rectifier bridge circuit 130 and a wire between a seventh node 136 and the rectifier bridge circuit 130.

This embodiment can have the beneficial effect of saving power consumption by disconnecting the rectifier bridge circuit when the input power supply is the direct current power supply. Needless to say, this modification example can also have the same effect, for example, when a voltage boosting circuit or a voltage reducing circuit is applied to the first non-insulated chopper circuit 25 or the second non-insulated chopper circuit 30 of FIG. 1, or in the second embodiment of the present invention illustrated in FIG. 4.

Figure 6A:
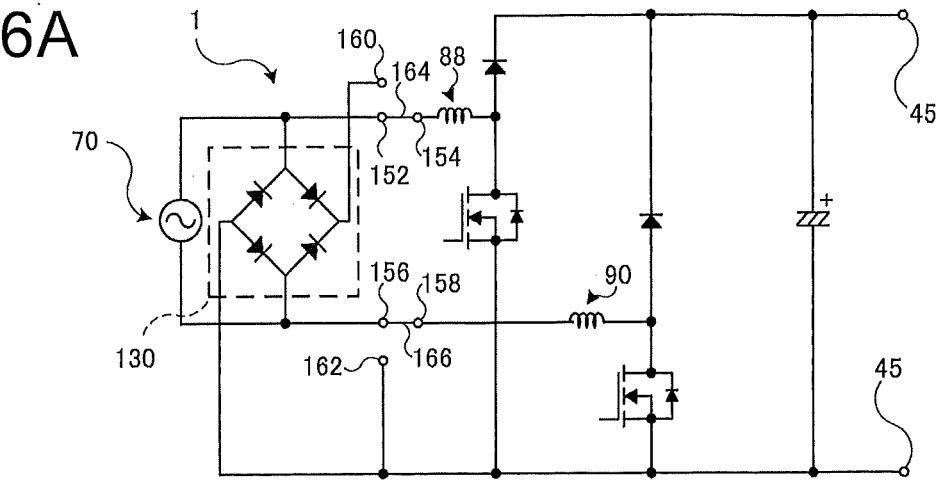
FIG. 6A is a circuit diagram in the dual boost scheme applied when the input power supply is the alternating current power supply.
Figure 6B:
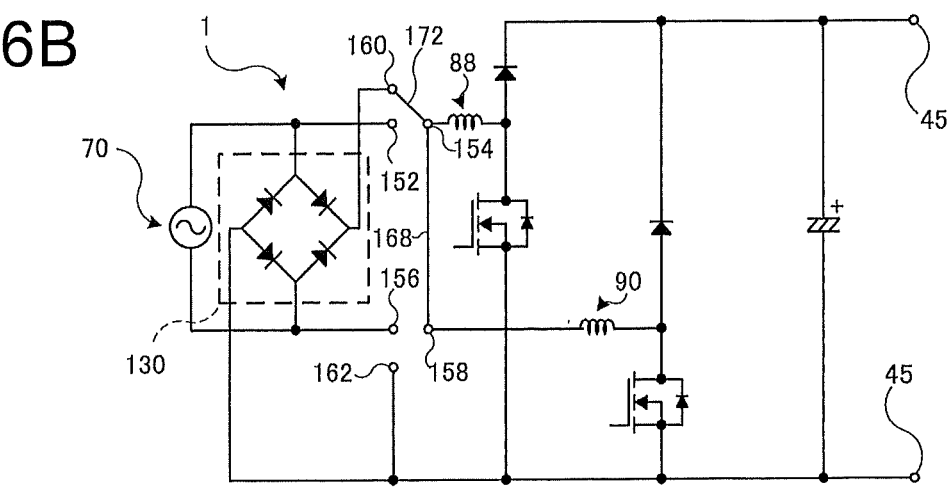
FIG. 6B is a circuit diagram in the interleaving scheme through the rectifier bridge circuit used when the input power supply is the alternating current power supply.
Figure 6C:
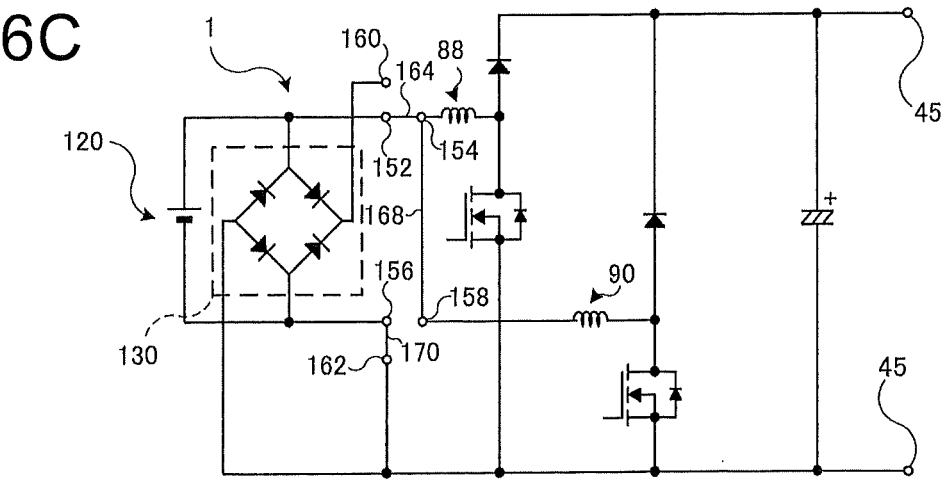
FIG. 6C is a circuit diagram in the interleaving scheme applied when the input power supply is the direct current power supply.

As another modification example, as illustrated in FIGS. 6A to 6C, it is conceivable to provide the switching circuit 15 (refer to FIG. 1) on the side of the non-insulated chopper circuits relative to the rectifier bridge circuit. To be more specific, the power input terminals are connected to the bridge input terminals of the rectifier bridge circuit 130. The switching circuit 15 includes a fifth contact 152 provided between one of the power input terminals and the first reactor 88 on the side of the one of the power input terminals, a sixth contact 154 provided between the one of the power input terminals and the first reactor 88 on the side of the first reactor 88 (on the side of the first input-side node 25A (refer to FIG. 1)), a seventh contact 156 provided between the other of the power input terminals and the second reactor 90 on the side of the other of the power input terminals, an eighth contact 158 provided between the other of the power input terminals and the second reactor 90 on the side of the second reactor 90 (on the side of the second input-side node 30A (refer to FIG. 1)) relative to the seventh contact 156, a ninth contact 160 provided at one of the bridge output terminals of the rectifier bridge circuit 130, and a tenth contact 162 connected to the other of the bridge output terminals of the rectifier bridge circuit 130 and the negative electrode of the smoothing capacitor.

FIG. 6A is a circuit diagram in the dual boost scheme when the input power supply is the alternating current power supply 70. The fifth contact 152 and the sixth contact 154 are connected through a fourth connection wire 164, and the seventh contact 156 and the eighth contact 158 are connected through a fifth connection wire 166. This connection constitutes the dual boost circuit when the input power supply is the alternating current power supply 70, thus having the effect of suppressing harmonic currents.

FIG. 6B is a circuit diagram in an interleaving scheme through the rectifier bridge circuit used when the input power supply 10 is the alternating current power supply 70. To be more specific, the ninth contact 160 and the sixth contact 154 are connected through an eighth connection wire 172, and the sixth contact 154 and the eighth contact 158 are connected through a sixth connection wire 168. In this circuit, if the alternating current power supply 70 is replaced with the direct current power supply 120, the same rated output power as that when the alternating current power supply is adopted can be outputted.

According to the switching power supply of this modification example, the interleaving circuit is constituted through the rectifier bridge circuit. When the input power supply is the alternating current power supply, it is possible to suppress harmonic currents, as the circuit acts as the power factor improvement circuit. Even when the input power supply is the direct current power supply, it is possible to output the same rated output power as that when the alternating current power supply is adopted.

FIG. 6C is a circuit diagram in the interleaving scheme when the input power supply is the direct current power supply 120. To be more specific, the fifth contact 152 and the sixth contact 154 are connected through the fourth connection wire 164, the sixth contact 154 and the eighth contact 158 are connected through the sixth connection wire 168, and the seventh contact 156 and the tenth contact 162 are connected through a seventh connection wire 170. This connection constitutes the interleaving circuit having a reduced conduction loss when the input power supply is the direct current power supply 120.

The switching power supply according to the modification example has the contacts the connection of which is changeable, and therefore can have the beneficial effect of allowing switching between the ACDC converter function and the DCDC converter function, by switching connection, on the basis of whether the input power supply is the alternating current power supply or the direct current power supply. The switching power supply can have the beneficial effect of actualizing a diode circuit for noise reduction and reactor protection, by the provision of the one rectifier bridge circuit, i.e., a small number of components.

The switching power supply according to the modification example can have the beneficial effect of suppressing harmonic currents, when the input power supply is the alternating current power supply, by switching into the dual power factor improvement circuit, and changing to the interleaving circuit configuration having a reduced conduction loss, when the input power supply is the direct current power supply.

According to the switching power supply of the modification example, there is provided the switching circuit configured to switch the circuit between the power input terminals, and the first non-insulated chopper circuit and the second non-insulated chopper circuit on the basis of the type of the input power supply. Thus, the switching power supply according to the modification example can have the beneficial effect of switching between the dual power factor improvement circuit to suppress harmonic currents when the input power supply is the alternating current power supply, and the interleaving circuit when the input power supply is the direct current power supply, in the same circuit board.

In other words, in the case of the direct current power supply, only one circuit operates in the dual scheme. In this case, to output the same rated output power as that when the alternating current power supply is adopted, a conduction loss of the non-insulated chopper circuit has been increased, so that a rated output power of the direct current power supply has been required to be reduced. In contrast, the present invention can have the beneficial effect of allowing a reduction of the conduction loss of the non-insulated chopper circuit, by changing to the interleaving scheme in which circuits are in parallel with the direct current power supply, and thus allowing outputting the same rated output power as that when the alternating current power supply is adopted, even with the use of the direct current power supply.

The switching power supply according to the modification example has the beneficial effect of composing the diode circuit, for noise reduction and reactor protection, of the one rectifier bridge circuit, i.e., a small number of components. The switching circuit can have the beneficial effect of allowing switching to the interleaving scheme, even if the input power supply is the alternating current power supply.

What is claimed is:

1. A switching power supply comprising:
   power input terminals to which a direct current power supply or an alternating current power supply is connected as an input power supply;
   power output terminals configured to output electric power;
   a smoothing capacitor connected between the power output terminals;
   a first non-insulated chopper circuit connected between the power output terminals;
   a second non-insulated chopper circuit connected between the power output terminals; and
   a switching circuit configured to switch a connection circuit provided between the first non-insulated chopper circuit and the second non-insulated chopper circuit, and the power input terminals.

2. The switching power supply according to claim 1, wherein
   the first non-insulated chopper circuit has a first input-side node, a first positive-side node connected to a positive side of the power output terminals, and a first negative-side node connected to a negative side of the power output terminals, the second non-insulated chopper circuit has a second input-side node, a second positive-side node connected to the positive side of the power output terminals, and a second negative-side node connected to the negative side of the power output terminals, and the switching circuit is configured to switch between
- a first connection mode in which the first input-side node is connected to one of the power input terminals and the second input-side node is connected to the other of the power input terminals, and
- a second connection mode in which the first input-side node and the second input-side node are connected to one of the power input terminals and the first negative-side node and the second negative-side node are connected to the other of the power input terminals.

3. The switching power supply according to claim 2, wherein the switching circuit is in the first connection mode when the alternating current power supply is connected to the power input terminals, and is in the second connection mode when the direct current power supply is connected to the power input terminals.

4. The switching power supply according to claim 3, wherein
the first non-insulated chopper circuit includes a first switching element, a first reverse current prevention element, and a first reactor, and
the second non-insulated chopper circuit includes a second switching element, a second reverse current prevention element, and a second reactor.

5. The switching power supply according to claim 4, wherein the switching circuit includes:
the first non-insulated chopper circuit constitutes a first serial circuit by serial connection of the first switching element and the first reverse current prevention element, and the first reactor is connected between the first switching element and the first reverse current prevention element,
the second non-insulated chopper circuit constitutes a second serial circuit by serial connection of the second switching element and the second reverse current prevention element, and the second reactor is connected between the second switching element and the second reverse current prevention element.

6. The switching power supply according to claim 2, wherein the switching circuit includes:
a first contact provided between one of the power input terminals and the first input-side node,
a second contact provided between the other of the power input terminals and the second input-side node, on a side of the other of the power input terminals,
a third contact provided between the other of the power input terminals and the second input-side node, on a side of the second input-side node relative to the second contact, and
a fourth contact connected to a negative electrode of the smoothing capacitor.

7. The switching power supply according to claim 6, wherein, when the input power supply is the alternating current power supply, the switching circuit connects the second contact to the third contact, and when the input power supply is the direct current power supply, the switching circuit connects the first contact to the third contact, and connects the second contact to the fourth contact.

8. The switching power supply according to claim 7, further comprising:
a third serial circuit having a third reverse current prevention element and a fourth reverse current prevention element connected to each other in series; and
a fourth serial circuit having a fifth reverse current prevention element and a sixth reverse current prevention element connected to each other in series, wherein
one end of the third serial circuit and one end of the fourth serial circuit are connected to a positive electrode of the smoothing capacitor,
the first contact of the switching circuit and the first non-insulated chopper circuit are connected between the fifth reverse current prevention element and the sixth reverse current prevention element of the fourth serial circuit,
the other end of the third serial circuit and the other end of the fourth serial circuit are connected to the negative electrode of the smoothing capacitor, and
the third contact of the switching circuit and the second non-insulated chopper circuit are connected between the third reverse current prevention element and the fourth reverse current prevention element of the third serial circuit.

9. The switching power supply according to claim 8, wherein the third to sixth reverse current prevention elements constitute a rectifier bridge circuit, in which
bridge input terminals are disposed between the fifth reverse current prevention element and the sixth reverse current prevention element of the fourth serial circuit, and between the third reverse current prevention element and the fourth reverse current prevention element of the third serial circuit, and
bridge output terminals are disposed between the one end of the third serial circuit and the one end of the fourth serial circuit, and between the other end of the third serial circuit and the other end of the fourth serial circuit.

10. The switching power supply according to claim 9, wherein, when the input power supply is the direct current power supply, the rectifier bridge circuit is disconnected from the power output terminals and the power input terminals.

11. The switching power supply according to claim 10, further comprising:
a detection unit configured to detect whether the input power supply is the alternating current power supply or the direct current power supply; and
a control unit configured to control the switching circuit in accordance with the first connection mode or the second connection mode on a basis of a detection signal of the detection unit.

12. The switching power supply according to claim 11, wherein the switching circuit switches the connection circuit using conductive members.

13. The switching power supply according to claim 10, wherein the switching circuit switches the connection circuit using conductive members.

14. The switching power supply according to claim 2, further comprising:
a detection unit configured to detect whether the input power supply is the alternating current power supply or the direct current power supply; and
a control unit configured to control the switching circuit in accordance with the first connection mode or the second connection mode on a basis of a detection signal of the detection unit.

15. The switching power supply according to claim 14, wherein the switching circuit switches the connection circuit using conductive members.

16. The switching power supply according to claim 1, wherein the switching circuit switches the connection circuit using conductive members.

17. The switching power supply according to claim 1, wherein
the power input terminals are connected to bridge input terminals of a rectifier bridge circuit,
the first non-insulated chopper circuit has
a first input-side node,
a first positive-side node connected to a positive side of the power output terminals, and
a first negative-side node connected to a negative side of the power output terminals,
the second non-insulated chopper circuit has
a second input-side node,
a second positive-side node connected to the positive side of the power output terminals, and
a second negative-side node connected to the negative side of the power output terminals,
the switching circuit includes
a fifth contact provided between one of the power input terminals and the first input-side node on a side of the one power input terminal,
a sixth contact provided between the one power input terminal and the first input-side node on a side of the first input-side node,
a seventh contact provided between the other of the power input terminals and the second input-side node on a side of the other power input terminal,
an eighth contact provided between the other power input terminal and the second input-side node on a side of the second input-side node relative to the seventh contact,
a ninth contact provided at one bridge output terminal of the rectifier bridge circuit, and
a tenth contact connected to another bridge output terminal of the rectifier bridge circuit and a negative electrode of the smoothing capacitor, when the input power supply is the alternating current power supply, the fifth contact is connected to the sixth contact, and the seventh contact is connected to the eighth contact, when the input power supply is the direct current power supply, the fifth contact is connected to the sixth contact, the sixth contact is connected to the eighth contact, and the seventh contact is connected to the tenth contact, and when the input power supply is any of the alternating current power supply and the direct current power supply, the sixth contact is connected to the ninth contact, and the sixth contact is connected to the eighth contact.

18. A switching power supply comprising:

power input terminals to which a direct current power supply or an alternating current power supply is connected;

power output terminals configured to output electric power;

a smoothing capacitor connected between the power output terminals;

a first non-insulated chopper circuit connected between the power output terminals;

a second non-insulated chopper circuit connected between the power output terminals; and a switching circuit configured to switch a connection circuit provided between the first non-insulated chopper circuit and the second non-insulated chopper circuit, and the power input terminals using conductive members, wherein the switching circuit switches the connection of the power input terminals, the first non-insulated chopper circuit, and the second non-insulated chopper circuit between an ACDC converter mode in a dual boost scheme and a DCDC converter mode in an interleaving voltage boost scheme.

* * * * *